(12) United States Patent
Nakamura et al.

(10) Patent No.: US 9,981,564 B2
(45) Date of Patent: May 29, 2018

(54) POWER TRANSMISSION DEVICE AND POWER RECEPTION DEVICE

(71) Applicants: TOYOTA JIDOSHA KABUSHIKI KAISHA, Toyota-shi, Aichi-ken (JP); KOJIMA INDUSTRIES CORPORATION, Toyota-shi, Aichi-ken (JP); YAZAKI CORPORATION, Tokyo (JP)

(72) Inventors: Toru Nakamura, Toyota (JP); Hideaki Yamada, Kariya (JP); Makoto Kawaide, Chiryu (JP); Satoru Horiuchi, Gotenba (JP); Hiroaki Saito, Nagoya (JP)

(73) Assignees: TOYOTA JIDOSHA KABUSHIKI KAISHA, Toyota (JP); KOJIMA INDUSTRIES CORPORATION, Toyota (JP); YAZAKI CORPORATION, Tokyo (JP)

( * ) Notice: Subject to any disclaimer, the term of this patent is extended or adjusted under 35 U.S.C. 154(b) by 336 days.

(21) Appl. No.: 14/736,850

(22) Filed: Jun. 11, 2015

(65) Prior Publication Data
US 2016/0006260 A1    Jan. 7, 2016

(30) Foreign Application Priority Data

Jul. 4, 2014 (JP) .................................. 2014-138791

(51) Int. Cl.
*B60L 11/18* (2006.01)
*H02J 50/60* (2016.01)
(Continued)

(52) U.S. Cl.
CPC ......... *B60L 11/182* (2013.01); *B60L 11/1829* (2013.01); *B60L 11/1831* (2013.01);
(Continued)

(58) Field of Classification Search
None
See application file for complete search history.

(56) References Cited

U.S. PATENT DOCUMENTS

| 7,741,734 B2 | 6/2010 | Joannopoulos et al. |
| 9,178,361 B2 * | 11/2015 | Liu .......................... H02J 5/005 |

(Continued)

FOREIGN PATENT DOCUMENTS

| AU | 2006269374 B2 | 1/2007 |
| AU | 2006269374 C1 | 1/2007 |

(Continued)

*Primary Examiner* — Jared Fureman
*Assistant Examiner* — James Evans
(74) *Attorney, Agent, or Firm* — Oliff PLC (57) ABSTRACT

A foreign object detector includes a plurality of first coils and a plurality of second coils. The plurality of first coils are arranged along an upper surface of a power transmission coil. The plurality of second coils are provided to correspond to the plurality of first coils, with the second coils each being arranged to face a corresponding one of the first coils. An outer shape of each of the plurality of first coils and each of the plurality of second coils is smaller than an outer shape of the power transmission coil when the power transmission coil is viewed two-dimensionally from above the power transmission coil.

10 Claims, 7 Drawing Sheets

(51) Int. Cl.
  *G01V 3/10*   (2006.01)
  *H02J 50/70*  (2016.01)
  *H02J 50/40*  (2016.01)
  *H02J 50/12*  (2016.01)
  *H01F 38/14*  (2006.01)

(52) U.S. Cl.
  CPC .............. *G01V 3/104* (2013.01); *H01F 38/14* (2013.01); *H02J 50/12* (2016.02); *H02J 50/40* (2016.02); *H02J 50/60* (2016.02); *H02J 50/70* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 9,360,456 B2 * | 6/2016 | Miyamoto | H01F 5/003 |
| 2002/0077537 A1 * | 6/2002 | Avrin | A61B 5/04005 |
| | | | 600/409 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2013/0099592 A1 | 4/2013 | Abe | |
| 2013/0127409 A1 | 5/2013 | Ichikawa | |
| 2013/0193749 A1 | 8/2013 | Nakamura et al. | |
| 2013/0241300 A1 * | 9/2013 | Miyamoto | H01F 5/003 |
| | | | 307/104 |
| 2014/0084857 A1 * | 3/2014 | Liu | H02J 5/005 |
| | | | 320/108 |
| 2014/0159503 A1 | 6/2014 | Murakarni et al. | |
| 2015/0008877 A1 | 1/2015 | Ichikawa et al. | |
| 2015/0145529 A1 * | 5/2015 | Urano | G01N 27/025 |
| | | | 324/655 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 104682571 A | 6/2015 |
| EP | 1 902 505 A2 | 3/2008 |
| EP | 2 130 287 A1 | 12/2009 |
| IN | 735/DELPNP/2008 | 5/2008 |
| IN | 6195/DELNP/2009 | 7/2010 |
| JP | 2009-501510 A | 1/2009 |
| JP | 2012-016125 A | 1/2012 |
| JP | 2013-027171 A | 2/2013 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2015-128363 A | 7/2015 |
| KR | 2008-0031398 A | 4/2008 |
| KR | 2010-0015954 A | 2/2010 |
| WO | 20071008646 A2 | 1/2007 |
| WO | 2008/118178 A1 | 10/2008 |

* cited by examiner

ND POWER RECEPTION DEVICE

This nonprovisional application is based on Japanese Patent Application No. 2014-138791 filed on Jul. 4, 2014 with the Japan Patent Office, the entire contents of which are hereby incorporated by reference.

BACKGROUND OF THE INVENTION

Field of the Invention

The present invention relates to power transmission devices and power reception devices, and more particularly to detection of a foreign object between a power transmission device and a power reception device that exchange electric power in a contactless manner.

Description of the Background Art

There have been proposed a variety of contactless electric power transfer systems in which electric power is transferred from a power transmission device to a power reception device in a contactless manner.

In such a contactless electric power transfer system, it is expected that a foreign object (an object that should not be present) will enter between the power transmission device and the power reception device, and it is necessary to properly detect the foreign object. For example, Japanese Patent Laying-Open No. 2013-27171 discloses a detection device capable of accurately detecting a metallic foreign object even during power transmission from a power transmission device to a power reception device. This detection device detects a metallic foreign object present between the power transmission device and the power reception device based on a change in Q factor of a resonant circuit including a coil. This coil for Q factor measurement may be provided separately from a power feeding coil (a power transmission coil or a power reception coil), or the power feeding coil may be used as this coil.

In the detection device described in Japanese Patent Laying-Open No. 2013-27171, the power feeding coil may be used as the coil for Q factor measurement, and if the coil for Q factor measurement is provided separately from the power feeding coil, the coil for Q factor measurement is expected to have a similar size to the power feeding coil. However, in a system handling high power such as a contactless power feeding system of a vehicle, for example, the power feeding coil increases in size to some extent which may result in inability to detect a relatively small foreign object compared to the power feeding coil.

SUMMARY OF THE INVENTION

Accordingly, an object of the present invention is that a relatively small foreign object compared to a power transmission coil can be detected in a power transmission device that transmits electric power to a power reception device in a contactless manner.

Another object of the present invention is that a relatively small foreign object compared to a power reception coil can be detected in the power reception device that receives electric power output from the power transmission device in a contactless manner.

According to the present invention, a power transmission device that transmits electric power to a power reception device includes a power transmission coil and a foreign object detector. The power transmission coil is configured to transmit electric power to a power reception coil of the power reception device in a contactless manner. The foreign object detector is provided above the power transmission coil, with the power transmission coil being configured to transmit electric power to the power reception coil located above the power transmission coil. The foreign object detector includes a plurality of first coils and a plurality of second coils. The plurality of first coils are arranged along an upper surface of the power transmission coil. The plurality of second coils are arranged along the upper surface of the power transmission coil above or below the plurality of first coils, and provided to correspond to the plurality of first coils. The plurality of second coils are each arranged to face a corresponding one of the first coils. An outer shape of each of the plurality of first coils and of each of the plurality of second coils is smaller than an outer shape of the power transmission coil when the power transmission coil, the plurality of first coils and the plurality of second coils are viewed two-dimensionally from above the power transmission coil.

In this power transmission device, the foreign object detector includes the plurality of first coils and the plurality of second coils, with the plurality of first coils and the plurality of second coils being provided as a set in the power transmission device. Consequently, the distance between the first coils and the corresponding second coils can be reduced to decrease the size of the first coils and the second coils. In addition, according to this power transmission device, the outer shape of each first coil and each second coil is smaller than the outer shape of the power transmission coil, allowing the foreign object detector to detect a relatively small foreign object compared to the power transmission coil.

Preferably, the plurality of first coils and the plurality of second coils are arranged in a matrix, within a housing containing the power transmission coil, on an upper surface of the housing.

With this configuration, a small foreign object on the housing containing the power transmission coil can be detected. Further, the plurality of first coils and the plurality of second coils can be protected against breakage and contamination.

Preferably, the plurality of first coils and the plurality of second coils each have a shape formed by arranging at least one pair of coil elements having a same number of turns and wound in opposite directions on a same plane and by connecting the coil elements in series.

Each first coil and each second coil receive a magnetic flux generated by the power transmission coil during power transmission from the power transmission coil to the power reception coil. Since this magnetic flux penetrates the coil elements in the same direction, the induced voltages generated in the coil elements are canceled by each other by employing the above configuration. According to this power transmission device, therefore, the generation of induced voltage in the foreign object detector during power transmission from the power transmission coil to the power reception coil can be suppressed. It is noted that the at least one pair of coil elements includes one pair of coils forming a figure of eight, two pairs of coil elements forming a shape of petals, and the like.

Preferably, the foreign object detector further includes a switching device. The switching device is configured to switch among pairs of coils, the pairs each including one of the plurality of first coils to which an AC voltage for detection is applied (hereinafter referred to as an "energized coil") and one of the second coils corresponding to the energized coil. The power transmission device further includes a control device. The control device controls the switching device so as to successively switch among the pairs each including the energized coil and the second coil corresponding to the energized coil, and determines presence or absence of a foreign object based on a power receiving state of the second coil corresponding to the energized coil.

With this configuration, a small foreign object can be detected over a broad range where the plurality of first coils and the plurality of second coils are arranged. It is noted that the power receiving state of the second coil indicates at least one of a receiving voltage, a receiving current and receiving power of the second coil.

More preferably, a resonant frequency of each of a first resonant circuit including the energized coil and a second resonant circuit including the second coil corresponding to the energized coil is higher than a frequency of an AC voltage supplied to the power transmission coil. More preferably, the resonant frequency is different from a harmonic frequency of the AC voltage supplied to the power transmission coil.

With this configuration, the effect of the magnetic field formed by the power transmission coil on the foreign object detector can be suppressed.

According to the present invention, a power reception device that receives electric power output from a power transmission device includes a power reception coil and a foreign object detector. The power reception coil is configured to receive electric power from a power transmission coil of the power transmission device in a contactless manner. The foreign object detector is provided below the power reception coil, with the power reception coil being configured to receive electric power from the power transmission coil located below the power reception coil. The foreign object detector includes a plurality of first coils and a plurality of second coils. The plurality of first coils are arranged along a lower surface of the power reception coil. The plurality of second coils are arranged along the lower surface of the power reception coil above or below the plurality of first coils, and provided to correspond to the plurality of first coils. The plurality of second coils are each arranged to face a corresponding one of the first coils. An outer shape of each of the plurality of first coils and of each of the plurality of second coils is smaller than an outer shape of the power reception coil when the power reception coil, the plurality of first coils and the plurality of second coils are viewed two-dimensionally from below the power reception coil.

In this power reception device, the plurality of first coils and the plurality of second coils are provided as a set in the power reception device. Consequently, the distance between the first coils and the corresponding second coils can be reduced to decrease the size of the first coils and the second coils. In addition, according to this power reception device, the outer shape of each first coil and each second coil is smaller than the outer shape of the power transmission coil, allowing the foreign object detector to detect a relatively small foreign object compared to the power reception coil.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below in detail with reference to the drawings, in which the same or corresponding parts are designated by the same reference characters and description thereof will not be repeated. Although a plurality of embodiments will be described below, it is originally intended to appropriately combine configurations described in the embodiments. Unless otherwise specified, the scope of the present invention is not necessarily limited to numbers, amounts and the like mentioned.

First Embodiment

Figure 1:
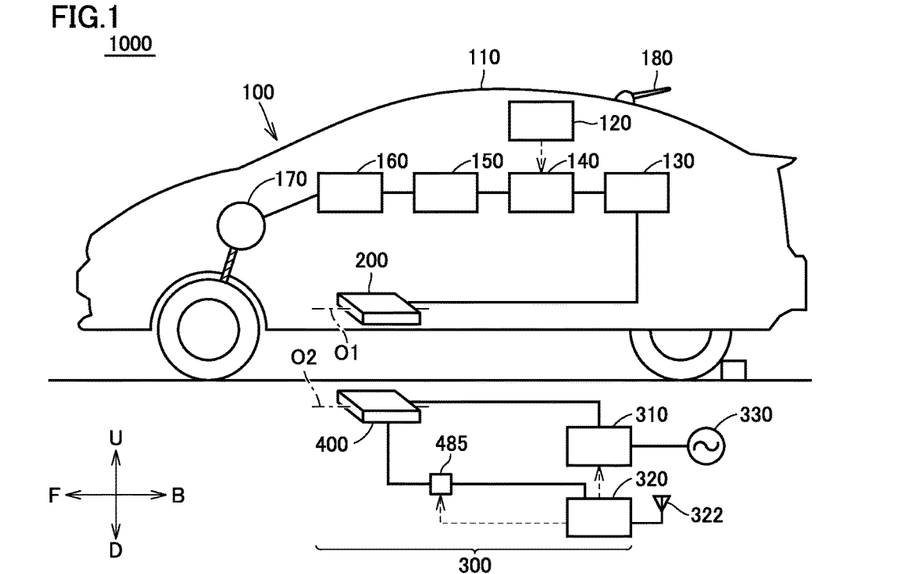
FIG. 1 is a schematic configuration diagram of a contactless electric power transfer system to which a power transmission device according to a first embodiment of the present invention is applied.

FIG. 1 is a schematic configuration diagram of a contactless electric power transfer system to which a power transmission device according to a first embodiment of the present invention is applied. In the figure, an arrow D indicates a vertically downward direction, an arrow U indicates a vertically upward direction, an arrow F indicates a vehicle forward direction, and an arrow B indicates a vehicle backward direction. These directions also apply to FIGS. 2, 3, 8 and 12 which will be described later.

Referring to FIG. 1, a contactless electric power transfer system 1000 includes a vehicle 100 and a power transmission device 300. Vehicle 100 includes a vehicle body 110 and a power reception unit 200. Vehicle body 110 includes a vehicle ECU (Electronic Control Unit) 120, a rectifier 130, a DC/DC converter 140, a power storage device 150, a power control unit 160, a drive unit 170, and a communication unit 180.

Power reception unit 200 is configured to receive electric power from a power transmission unit 400 of power transmission device 300 in a contactless manner while facing power transmission unit 400. Power reception unit 200 includes a power reception coil having a core with a conducting wire wound therearound, and a resonant capacitor (neither shown). The number of turns of the conducting wire of the power reception coil is appropriately designed in consideration of the distance between the power reception coil and a power transmission coil of power transmission unit 400, and so as to increase a Q factor (for example, Q≥100) showing the intensity of resonance between the power reception coil and the power transmission coil and a coupling coefficient κ showing the degree of coupling therebetween.

Power transmission device 300 includes a high-frequency power device 310, a power transmission ECU 320, a communication unit 322, power transmission unit 400, and a control device 485. High-frequency power device 310 is connected to an AC power supply 330. Power transmission unit 400 includes the power transmission coil having a core with a conducting wire wound therearound, and a resonant capacitor (neither shown). It is intended that a coil winding axis O1 of the power reception coil of power reception unit 200 and a coil winding axis O2 of the power transmission coil of power transmission unit 400 be parallel with each other when vehicle 100 is parked in a position where electric power can be transferred from power transmission unit 400 to power reception unit 200 of vehicle 100.

The power transmission coil of power transmission unit 400 forms a magnetic field when high-frequency power (an AC voltage) is applied thereto from high-frequency power device 310, and transmits electric power to the power reception coil of power reception unit 200 in a contactless manner through the formed magnetic field. The number of turns of the conducting wire of the power transmission coil is also appropriately designed in consideration of the distance between the power transmission coil and the power reception coil, and so as to increase the Q factor (for example, Q≥100) and the coupling coefficient κ. Control device 485 will be described later with reference to FIG. 4.

Figure 2:
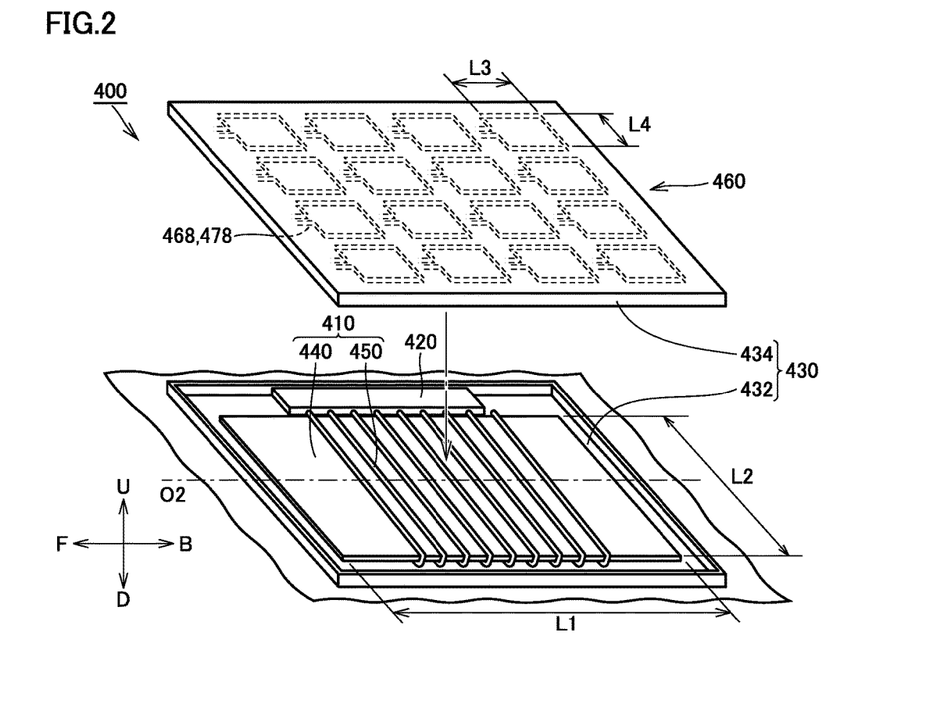
FIG. 2 is an exploded perspective view of a power transmission unit shown in FIG. 1.

FIG. 2 is an exploded perspective view of power transmission unit 400 shown in FIG. 1. Referring to FIG. 2, power transmission unit 400 includes a power transmission coil 410, a resonant capacitor 420, a housing 430, and a foreign object detector 460. Power transmission coil 410 includes a core 440, and a conducting wire 450 wound around core 440. As an example, core 440 is made of ferrite, and has lengths L1 and L2 of about 400 mm. Power transmission coil 410 and resonant capacitor 420 are contained in housing 430. Housing 430 includes a shield 432 and a cover member 434.

When there is a foreign object (an object that should not be present) between power transmission unit 400 and power reception unit 200, the foreign object generates heat or power transfer efficiency is lowered during power transfer from power transmission coil 410 to the power reception coil of power reception unit 200. When there is a foreign object between power transmission unit 400 and power reception unit 200 (FIG. 1), foreign object detector 460 detects such an object. Possible foreign objects include, for example, a piece of metal such as a beverage can or a coin, an animal, and the like.

Foreign object detector 460 includes a plurality of first coils 468 and a plurality of second coils 478. The plurality of first coils 468 and the plurality of second coils 478 are provided above power transmission coil 410, and arranged on an inner surface of cover member 434 of housing 430 in the first embodiment. The plurality of second coils 478 are provided to correspond to the plurality of first coils 468, and first coils 468 and second coils 478 each have the same size and shape. Each of second coils 478 is arranged to face a corresponding one of first coils 468, and forms a pair of coils together with the corresponding first coil 468. A plurality of pairs of coils corresponding to the number of the plurality of first coils 468 (the plurality of second coils 478) are arranged in a matrix on the inner surface of cover member 434.

That is, the plurality of pairs of coils are arranged in a matrix along an upper surface of power transmission coil 410 above power transmission coil 410. An outer shape (L3×L4) of each pair of coils (each first coil 468 and each second coil 478) is smaller than an outer shape (L1×L2) of power transmission coil 410. With the pairs of coils of this size, when there is a small foreign object that cannot be detected based on a change in power receiving state of the power reception coil (for example, a reduction in induced voltage generated in the power reception coil) between power transmission unit 400 and power reception unit 200, the foreign object can be detected.

More specifically, when there is a foreign object between power transmission unit 400 and power reception unit 200, the foreign object may be detected during power transmission from power transmission coil 410 to the power reception coil of power reception unit 200 by detecting a change in power receiving state of the power reception coil (for example, a reduction in induced voltage) which exhibits itself as a change (reduction) in coupling coefficient between power transmission coil 410 and the power reception coil. However, if the foreign object has a small size relative to power transmission coil 410 and the power reception coil, the effect of the foreign object on the coupling coefficient between power transmission coil 410 and the power reception coil is small, resulting in inability to detect the foreign object based on a change in power receiving state of the power reception coil.

In order to detect such a small foreign object, a pair of small coils needs to be used for foreign object detection separately from power transmission coil 410 and the power reception coil. By using the pair of small coils, the effect of the foreign object on the coupling coefficient between a coil on the power transmission side and a coil on the power reception side is relatively increased, allowing the detection of even a small foreign object based on a change in power receiving state of the coil on the power reception side. When the coil size is reduced, however, the distance between the coil on the power reception side and the coil on the power transmission side needs to be reduced so as to couple the coils together. In power transmission device 300 according to the first embodiment, therefore, the plurality of first coils 468 and the plurality of second coils 478 which are arranged to face each other in proximity to each other are provided as a set in power transmission device 300 above power transmission coil 410, allowing the detection of even a small foreign object that has entered between power transmission unit 400 and power reception unit 200.

Although a foreign object will be present above the pair of coils, not between first coil 468 and second coil 478 forming the pair of coils, the coupling coefficient between first coil 468 and second coil 478 still changes due to the presence of the foreign object to thereby change the power receiving state of second coil 478, thereby allowing the detection of the foreign object. It is noted that the power receiving state of second coil 478 is typically an induced voltage generated in second coil 478, but may be an induced current, induced power or the like generated in second coil 478.

Figure 3:
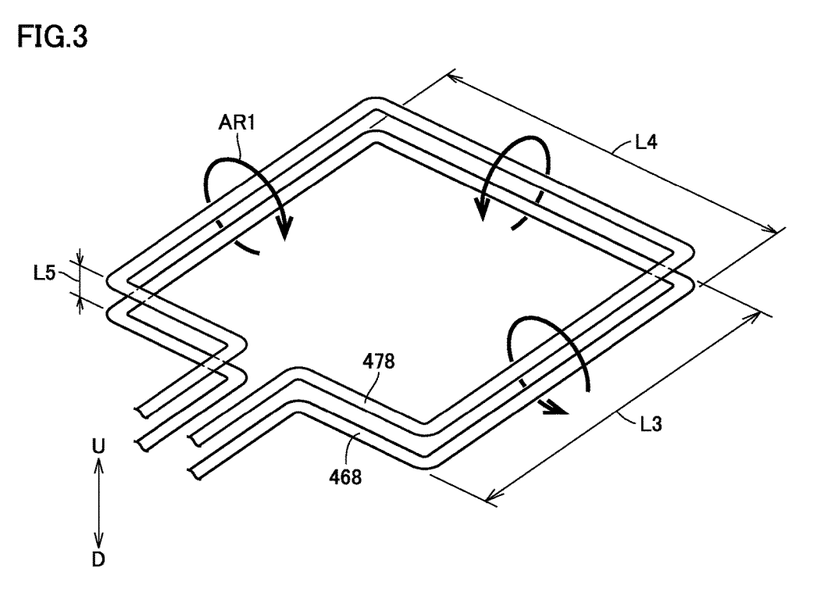
FIG. 3 is a perspective view of a pair of coils formed of a first coil and a second coil.

FIG. 3 is a perspective view of a pair of coils formed of first coil 468 and second coil 478. Referring to FIG. 3, first coil 468 and second coil 478 each have a rectangular shape. Second coil 478 is arranged to face corresponding first coil 468. A distance L5 between first coil 468 and second coil 478 is small relative to the outer shape (L3×L4) of first coil 468 and second coil 478. As an example, lengths L3 and L4 are 20 mm, and distance L5 is several mm. Such an arrangement of a pair of coils can be readily fabricated, for example, by patterning metal interconnect lines on opposite surfaces of a print substrate.

When an AC voltage for detection is applied to first coil 468, first coil 468 forms a magnetic field for detection AR1. Consequently, an induced voltage is generated by magnetic field for detection AR1 in second coil 478 arranged to face first coil 468. Here, when there is a foreign object in the vicinity of the pair of coils, magnetic field for detection AR1 is affected by the foreign object to change the coupling coefficient between first coil 468 and second coil 478, causing a change in power receiving state of second coil 478. The presence or absence of a foreign object is determined based on this change in power receiving state.

It is noted that the vertical positional relationship between first coil 468 and second coil 478 is not particularly limited. Second coil 478 may be arranged above first coil 468 (U direction) as shown, or may be arranged below first coil 468 (D direction).

Figure 4:
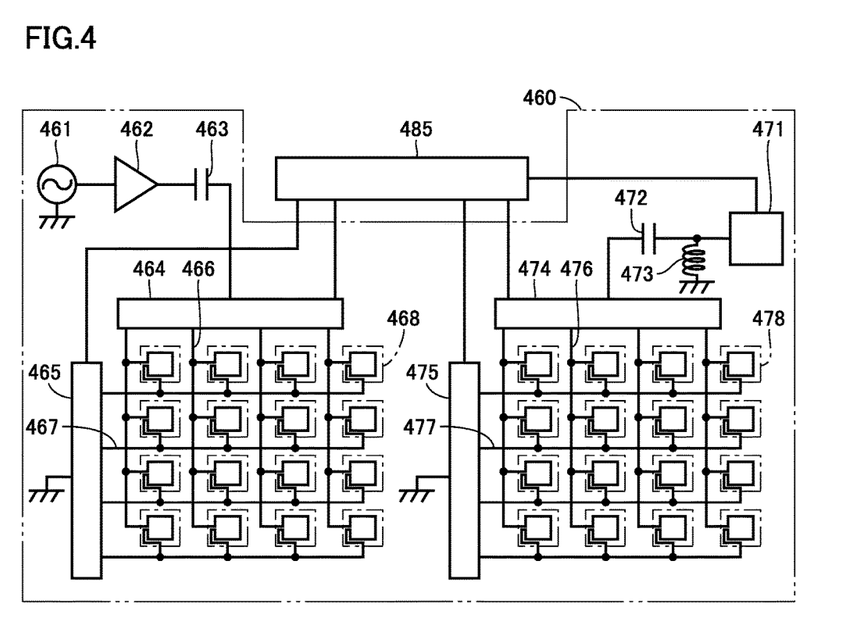
FIG. 4 is a diagram showing an electrical configuration of a foreign object detector shown in FIG. 2.

FIG. 4 is a diagram showing an electrical configuration of foreign object detector 460 shown in FIG. 2. Referring to FIG. 4, foreign object detector 460 includes, in addition to the plurality of first coils 468 and the plurality of second coils 478, an oscillator 461, a power amplifier 462, a resonant capacitor 463, multiplexers 464, 465, and a plurality of common interconnect lines 466, 467. Foreign object detector 460 further includes a signal processing circuit 471, a resonant capacitor 472, a resonant resistor 473, multiplexers 474, 475, and a plurality of common interconnect lines 476, 477.

The plurality of first coils 468 and the plurality of second coils 478 are shown as being away from each other for purposes of illustration, where in reality, each of second coils 478 is arranged to face a corresponding one of first coils 468, and forms a pair of coils together with the corresponding first coil 468, as was described with reference to FIG. 2. Although the first embodiment describes a configuration where sixteen pairs of coils are provided as an example, the number of pairs of coils is not limited thereto.

In the power transmission device according to the first embodiment, multiplexers 464, 465, 474 and 475 function as a "switching device." This switching device successively switches among pairs (pairs of coils) each including one of the plurality of first coils 468 to which the AC voltage for detection is applied and one of second coils 478 corresponding to this first coil 468 to which the AC voltage for detection is applied. This will be specifically described below.

Oscillator 461 generates a signal having an arbitrary frequency (for example, 13.56 MHz), and the signal is amplified by power amplifier 462. An AC voltage for foreign object detection which is output from power amplifier 462 is input to multiplexer 464 through resonant capacitor 463. Multiplexer 464 is connected to resonant capacitor 463, control device 485 and four common interconnect lines 466. On the other hand, multiplexer 465 is connected to a ground line, control device 485 and four common interconnect lines 467.

Each common interconnect line 466 is connected to one terminal of each of four first coils 468. Each common interconnect line 467 is connected to the other terminal of each of four first coils 468. Multiplexer 464 outputs an AC voltage to any one of four common interconnect lines 466 in accordance with a switching command from control device 485. Multiplexer 465 establishes electrical continuity between any one of four common interconnect lines 467 and the ground line in accordance with a switching command from control device 485.

The plurality of first coils 468 are arranged in a 4×4 matrix. By multiplexer 464 and multiplexer 465, the AC voltage from multiplexer 464 is applied to any one of sixteen first coils 468 at certain timing. The one of first coils 468 to which the AC voltage is to be applied is determined in accordance with the switching commands provided to multiplexers 464 and 465 from control device 485. Each first coil 468 forms a magnetic field for detection when the AC voltage for detection is applied thereto.

On the other hand, the plurality of second coils 478 are also arranged in a 4×4 matrix. Multiplexer 474 is connected to resonant capacitor 472, control device 485 and four common interconnect lines 476. Multiplexer 475 is connected to the ground line, control device 485 and four common interconnect lines 477. Each common interconnect line 476 is connected to one terminal of each of four second coils 478. Each common interconnect line 477 is connected to the other terminal of each of four second coils 478. Signal processing circuit 471 is connected to resonant capacitor 472 and resonant resistor 473. It is noted that resonant resistor 473 is provided so as to realize robust power transfer with respect to a shift in frequency.

When an AC voltage is applied to any one of sixteen first coils 468, this first coil 468 forms a magnetic field for detection. Second coil 478 arranged to face this first coil 468 generates an induced voltage by the magnetic field for detection formed by this first coil 468. This second coil 478 is specified in advance in accordance with switching commands transmitted to multiplexers 474 and 475 from control device 485.

Here, for each of a capacitance C1 of resonant capacitor 463 and an inductance L1 of each first coil 468, these circuit constants are predetermined to satisfy, regarding an oscillating frequency f1 of oscillator 461, $f1=1/(2\pi\times(L1\times C1)^{1/2})$. Likewise, for a capacitance C2 of resonant capacitor 472 and an inductance L2 of each second coil 478, these circuit constants are predetermined so as to satisfy $f1=1/(2\pi\times(L2\times C2)^{1/2})$. That is, a resonant circuit formed of first coil 468 and resonant capacitor 463 as well as a resonant circuit formed of second coil 478 and resonant capacitor 472 are each designed such that its resonant frequency matches oscillating frequency f1 of oscillator 461.

The induced voltage generated in second coil 478 corresponding to first coil 468 to which the AC voltage for detection has been applied is transmitted through multiplexer 474, resonant capacitor 472 and resonant resistor 473 to signal processing circuit 471 (for example, an AC/DC circuit). Signal processing circuit 471 converts the voltage received from resonant capacitor 472 into a signal suitable for reception by control device 485, and outputs the signal to control device 485.

Control device 485 determines the presence or absence of a foreign object based on the signal from signal processing circuit 471, that is, based on the power receiving state of second coil 478 corresponding to first coil 468 to which the AC voltage for detection has been applied. When there is a foreign object near first coil 468 and second coil 478, a magnetic field formed around first coil 468 and second coil 478 links the foreign object to thereby change the power receiving state of second coil 478. Control device 485 has a comparison value in advance, which corresponds to the power receiving state of second coil 478 without a foreign object, and determines that there is a foreign object when the level of the signal received from signal processing circuit 471 is lower than this comparison value.

The foreign object detection by foreign object detector 460 is basically performed before the start of power transmission from power transmission unit 400 to power reception unit 200, however, the detection can also be performed during the power transmission from power transmission unit 400 to power reception unit 200. During the power transmission from power transmission unit 400 to power reception unit 200, each first coil 468 and each second coil 478 are exposed to the magnetic field formed by power transmission coil 410. Accordingly, the resonant frequency of the above resonant circuits formed in foreign object detector 460 should be set to a value different from that of the frequency of the magnetic field formed by power transmission coil 410. That is, the resonant frequency (oscillating frequency f1 of oscillator 461) should be set to a value different from that of a frequency f2 of the AC voltage supplied to power transmission unit 400 from high-frequency power device 310.

Preferably, frequency f1 should be set to a value significantly higher (for example, at least 30 times) than that of frequency f2, the value also being shifted from the frequency of the harmonic of frequency f2. By setting frequency f1 in this manner, the generation of induced voltage in first coil 468 and second coil 478 caused by the magnetic field formed by power transmission coil 410 can be suppressed during power transmission from power transmission unit 400 to power reception unit 200, thereby realizing highly accurate detection of a foreign object. As an example, when frequency f2 is 85 kHz, frequency f1 may be set to 13.56 MHz.

As has been described, in the first embodiment, foreign object detector 460 includes the plurality of first coils 468 and the plurality of second coils 478, with the plurality of first coils 468 and the plurality of second coils 478 being provided as a set in power transmission unit 400. Consequently, the distance between first coils 468 and corresponding second coils 478 can be reduced to decrease the size of first coils 468 and second coils 478. In addition, according to the first embodiment, the outer shape of each first coil 468 and each second coil 478 is smaller than the outer shape of power transmission coil 410, allowing foreign object detector 460 to detect a relatively small foreign object compared to power transmission coil 410.

According to the first embodiment, the plurality of first coils 468 and the plurality of second coils 478 are arranged in a matrix within housing 430 on the upper surface of the housing (on the inner surface of cover member 434), allowing the detection of a small foreign object on power transmission unit 400. Further, the plurality of first coils 468 and the plurality of second coils 478 can be protected against breakage and contamination.

In the first embodiment, the use of multiplexers 464, 465, 474 and 475 provides partial commonality of the interconnect lines to suppress an increase in the amount of interconnect lines. According to the first embodiment, therefore, the number of first coils 468 and second coils 478 arranged can be increased to improve the accuracy of foreign object detection. From another perspective, an interconnect line is a member that tends to function as a metal shield, and an increase in the amount of interconnect lines may cause lowering of the power transfer efficiency. According to the first embodiment, an increase in the amount of interconnect lines can be suppressed to prevent the lowering of the power transfer efficiency.

In the first embodiment, the resonant frequency of the resonant circuits formed in foreign object detector 460 is higher than the frequency of the AC voltage supplied to power transmission coil 410. More preferably, the resonant frequency is different from the harmonic frequency of the AC voltage supplied to power transmission coil 410. With this configuration, according to the first embodiment, the effect of the magnetic field formed by power transmission coil 410 on foreign object detector 460 can be suppressed.

Variation of First Embodiment

Figure 5:
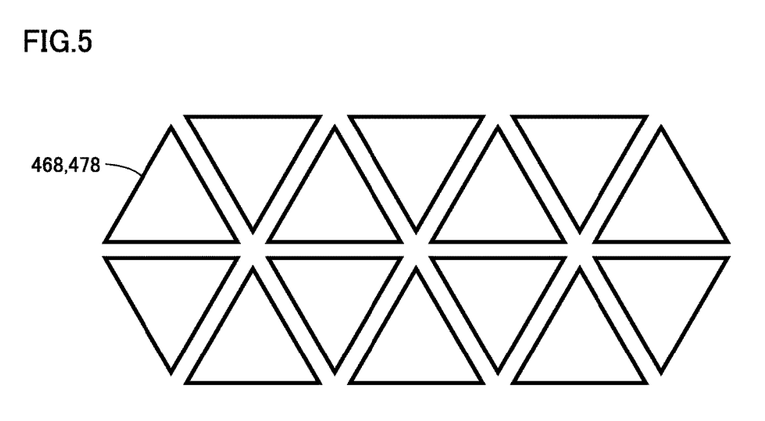
FIG. 5 is a diagram showing the shape of the first coils and the second coils in a variation of the first embodiment.
Figure 6:
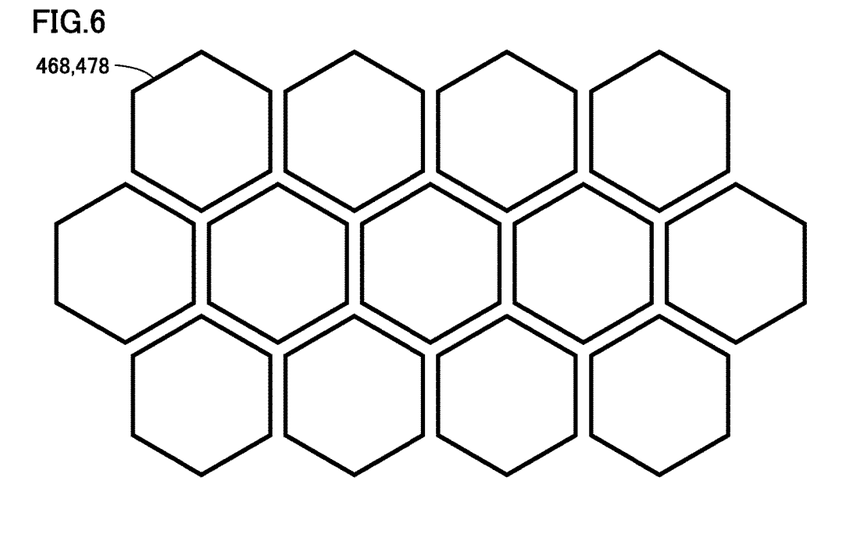
FIG. 6 is a diagram showing another shape of the first coils and the second coils.

Although first coils 468 and second coils 478 have a rectangular shape in the first embodiment above (FIG. 3), first coils 468 and second coils 478 may have a triangular shape as shown in FIG. 5. Alternatively, as shown in FIG. 6, first coils 468 and second coils 478 may have another polygonal shape such as a hexagonal shape. According to the coils having a polygonal shape, the detection sensitivities can be rendered uniform by making the coils to have the same size and shape.

Figure 7:
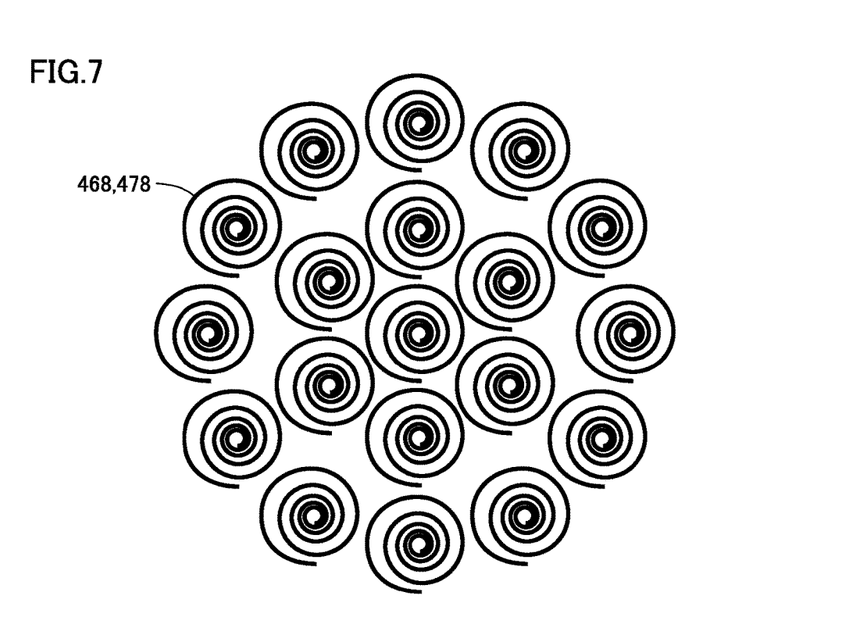
FIG. 7 is a diagram showing a still another shape of the first coils and the second coils.

Alternatively, as shown in FIG. 7, first coils 468 and second coils 478 each including a coil portion having a circular outer shape may be employed. In FIG. 7, a plurality of pairs of coils formed of first coils 468 and second coils 478 are concentrically arranged.

Second Embodiment

In first coils 468 and second coils 478 shown in FIGS. 3, and 5 to 7, an induced voltage is generated under the influence of the magnetic field formed by power transmission coil 410, which may result in lowering of the power transfer efficiency between power transmission coil 410 and power reception unit 200. For this reason, the first embodiment described preferably setting the resonant frequency of the resonant circuits formed in foreign object detector 460 to be different from the frequency (including the harmonic) of the AC voltage supplied to power transmission coil 410.

Figure 8:
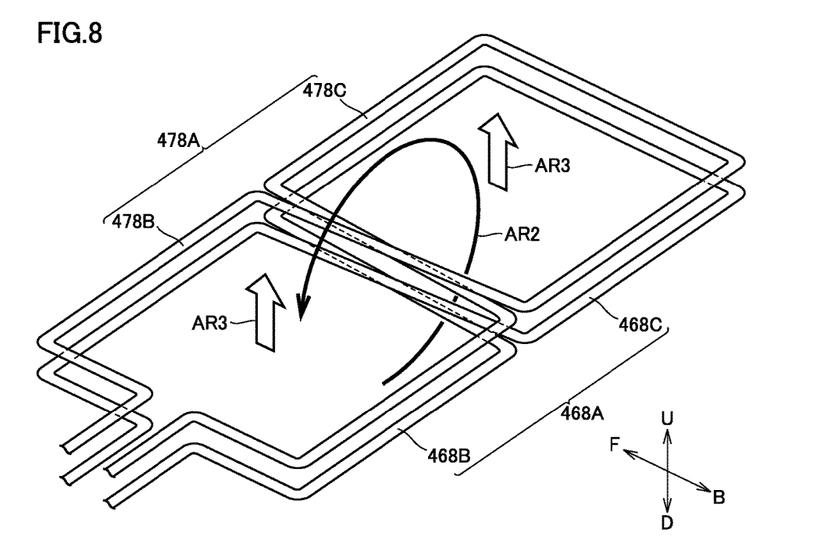
FIG. 8 is a perspective view of a pair of coils used in the foreign object detector in a second embodiment.

In a second embodiment, a coil having a shape less likely to be affected by the magnetic field formed by power transmission coil 410 is employed for each coil forming the foreign object detector.

FIG. 8 is a perspective view of a pair of coils used in the foreign object detector in the second embodiment. Referring to FIG. 8, in the second embodiment, a pair of coils formed of a first coil 468A and a second coil 478A is used instead of the pair of coils in the first embodiment shown in FIG. 3.

First coil 468A has a shape formed by arranging a pair of coil elements 468B and 468C having the same number of turns and wound in opposite directions on the same plane and connecting coil elements 468B and 468C in series (a figure of eight). Second coil 478A has a similar coil shape to first coil 468A, and is arranged to face corresponding first coil 468A.

When an AC voltage for detection is applied to first coil 468A, first coil 468A forms a magnetic field for detection AR2. Consequently, an induced voltage is generated by magnetic field for detection AR2 in second coil 478A arranged to face first coil 468A. While power transfer is being carried out between power transmission unit 400 and power reception unit 200, the coil elements each receive a magnetic flux (an arrow AR3) in the same direction and in the same amount. Although an induced voltage may be generated in each coil element by this magnetic flux AR3, the induced voltage generated in coil element 468B is canceled by the induced voltage generated in coil element 468C, leading to no generation of induced voltage in total in first coil 468A. The same applies to second coil 478A. Even if second coil 478A receives magnetic flux AR3, there is no generation of induced voltage in total in second coil 478A.

Therefore, according to the second embodiment having such a coil shape, the effect of the magnetic field formed by power transmission coil 410 during power transfer from power transmission unit 400 to power reception unit 200 on the foreign object detector can be suppressed. By suppressing the generation of induced voltage by the magnetic field caused by the power transfer, the entry of noise into the value of the induced voltage caused by the magnetic field for detection output from second coil 478A can be suppressed, thereby improving the detection sensitivity.

It is desirable that coil elements 468B and 468C (coil elements 478B and 478C) each receive the magnetic flux from power transmission coil 410 in amounts as equal as possible. It is thus preferable to arrange the pair of coils such that coil elements 468B and 468C (coil elements 478B and 478C) are aligned along a direction in which conducting wire 450 (FIG. 2) of power transmission coil 410 extends (a vehicle width direction).

Variation of Second Embodiment

Figure 9:
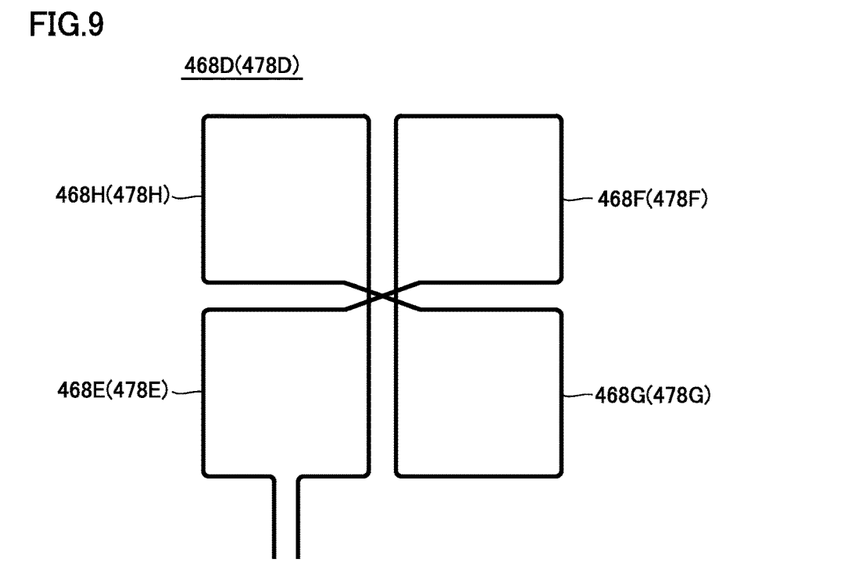
FIG. 9 is a diagram showing the shape of the first coil and the second coil in a variation of the second embodiment.

Although first coil 468A and second coil 478A each have the figure of eight by a pair of coil elements in the second embodiment above, the first coil and the second coil may each have a shape of petals by two pairs of coil elements as shown in FIG. 9. That is, a first coil 468D, which is an alternative to first coil 468A, is formed of a pair of coil elements 468E and 468F having the same number of turns and wound in opposite directions, and a pair of coil elements 468G and 468H having the same number of turns and wound in opposite directions. Coil elements 468E to 468H have a shape formed by arranging coil elements 468E to 468H on the same plane and successively connecting them in series. A second coil 478D, which is an alternative to second coil 478A, has the same configuration as first coil 468D.

Figure 10:
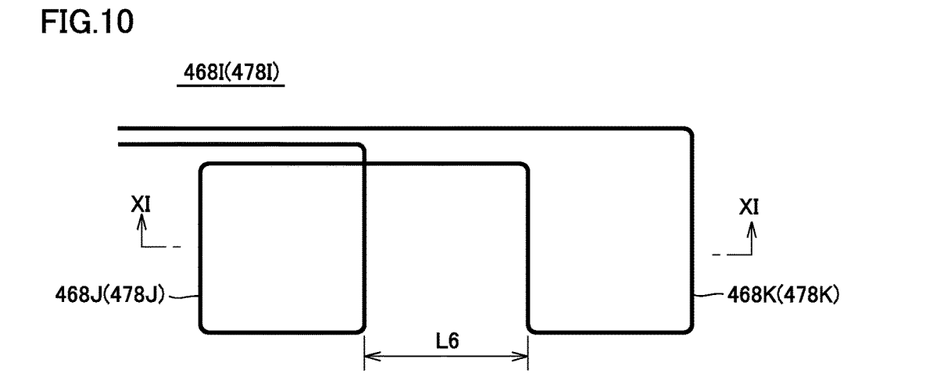
FIG. 10 is a diagram showing another shape of the first coil and the second coil.
Figure 11:
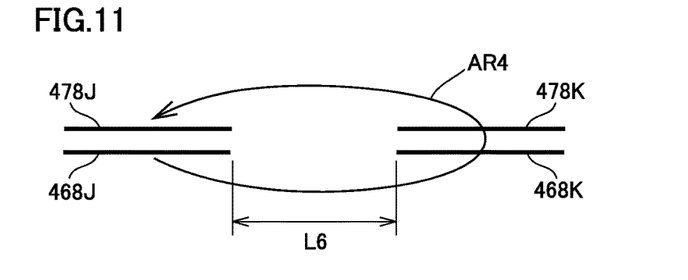
FIG. 11 is a cross-sectional view taken along the line XI-XI in FIG. 10.

Alternatively, as shown in a plan view of FIG. 10 and a cross-sectional view of FIG. 11, a pair of coils may be formed of a first coil 468I and a second coil 478I instead of first coil 468A and second coil 478A, with a distance L6 provided between a coil element 468J (478J) and a coil element 468K (478K). By increasing distance L6 between the coil elements, a magnetic field for detection AR4 formed by the application of an AC voltage for detection to first coil 468I can be increased to thereby improve the detection accuracy.

Third Embodiment

Although the foreign object detector is provided in power transmission device 300 in each of the embodiments above, the foreign object detector may be provided in the vehicle (the power reception device).

Figure 12:
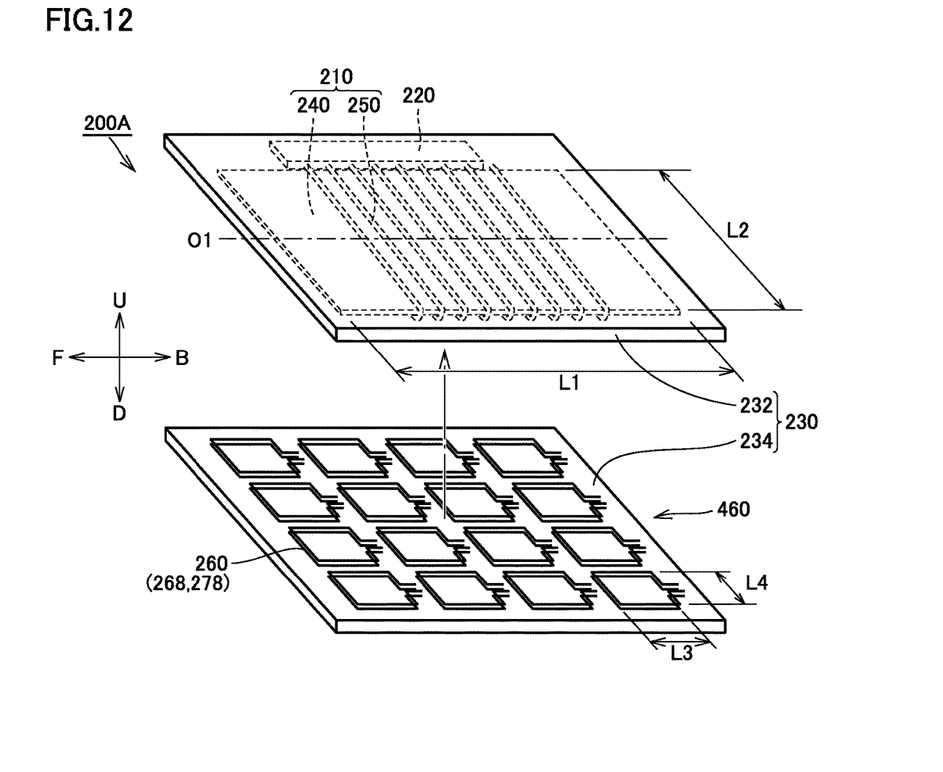
FIG. 12 is an exploded perspective view of a power reception unit mounted on a vehicle in a third embodiment.

FIG. 12 is an exploded perspective view of a power reception unit 200A mounted on the vehicle in a third embodiment. Referring to FIG. 12, power reception unit 200A includes a power reception coil 210, a resonant capacitor 220, a housing 230, and a foreign object detector 260. Power reception coil 210 includes a core 240, and a conducting wire 250 wound around core 240. Housing 230 includes a shield 232 and a cover member 234.

Foreign object detector 260 includes a plurality of first coils 268 and a plurality of second coils 278. The plurality of first coils 268 and the plurality of second coils 278 are provided below power reception coil 210, and arranged on an inner surface of cover member 234 of housing 230 in the third embodiment. The plurality of second coils 278 are provided to correspond to the plurality of first coils 268, and first coils 268 and second coils 278 each have the same size and shape. Each of second coils 278 is arranged to face a corresponding one of first coils 268, and forms a pair of coils together with the corresponding first coil 268. A plurality of pairs of coils corresponding to the number of the plurality of first coils 268 (the plurality of second coils 278) are arranged in a matrix on the inner surface of cover member 234.

The plurality of pairs of coils are arranged in a matrix along a lower surface of power reception coil 210 below power reception coil 210. An outer shape (L3×L4) of each pair of coils (each first coil 268 and each second coil 278) is smaller than an outer shape (L1×L2) of power reception coil 210. With the pairs of coils of this size, when there is a small foreign object that cannot be detected based on a change in power receiving state of power reception coil 210 (for example, a reduction in induced voltage generated in power reception coil 210) between power transmission unit 400 and power reception unit 200, the foreign object can be detected.

Although not particularly shown, first coils 268 and second coils 278 can be formed of coils having the shapes such as shown in FIGS. 5 to 11 in the third embodiment as well.

A similar effect to that of each of the embodiments above can be achieved in the third embodiment as well.

It is noted that the plurality of first coils and the plurality of second coils are not necessarily required to be arranged in a matrix in each of the embodiments above. With the matrix arrangement, multiplexers can be employed to reduce the number of interconnect lines.

Although foreign object detector 460 is provided on the inner surface of housing 430 of power transmission unit 400 (the inner surface of cover member 434) or on the inner surface of housing 230 of power reception unit 200 (the inner surface of cover member 234) so as to protect foreign object detector 460 against breakage and contamination in the above description, this arrangement is not a requirement, and foreign object detector 460 may be provided outside of the housing.

Although power transmission coil 410 and power reception coil 210 are each configured such that its coil winding axis extends in a front-back direction of the vehicle in the above description, the configuration of each coil is not limited thereto. For example, a helical coil having a coil winding axis extending in a vertical direction of the vehicle, or a spiral coil having a coil winding axis extending in the vertical direction of the vehicle may be employed as each of power transmission coil 410 and power reception coil 210.

It is intended to appropriately combine and practice the embodiments disclosed herein. It should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A power transmission device that transmits electric power to a power reception device, the power transmission device comprising:
   a power transmission coil configured to transmit electric power to a power reception coil of the power reception device in a contactless manner; and
   a foreign object detector provided above the power transmission coil, with the power transmission coil being configured to transmit the electric power to the power reception coil located above the power transmission coil,
   the foreign object detector including
      a plurality of first coils arranged along an upper surface of the power transmission coil, and a plurality of second coils arranged along the upper surface of the power transmission coil above or below the plurality of first coils, the plurality of second coils being provided to correspond to the plurality of first coils, the plurality of second coils each being arranged to face a corresponding one of the first coils, and an outer shape of each of the plurality of first coils and of each of the plurality of second coils being smaller than an outer shape of the power transmission coil when the power transmission coil, the plurality of first coils and the plurality of second coils are viewed two-dimensionally from above the power transmission coil, wherein the foreign object detector further includes a switching device configured to switch among pairs of coils, the pairs each including one of the plurality of first coils to which an AC voltage for detection is applied and one of the second coils corresponding to the first coil to which the AC voltage for detection is applied, and the power transmission device further comprises a control device controlling the switching device so as to successively switch among the pairs each including the first coil to which the AC voltage for detection is applied and the second coil corresponding to the first coil to which the AC voltage for detection is applied, the control device determining presence or absence of a foreign object based on a power receiving state of the second coil corresponding to the first coil to which the AC voltage for detection is applied.

2. The power transmission device according to claim 1, wherein the plurality of first coils and the plurality of second coils are arranged in a matrix, within a housing containing the power transmission coil, on an upper surface of the housing.

3. The power transmission device according to claim 1, wherein the plurality of first coils and the plurality of second coils each have a shape formed by arranging at least one pair of coil elements having a same number of turns and wound in opposite directions on a same plane and by connecting the coil elements in series.

4. The power transmission device according to claim 1, wherein a resonant frequency of each of a first resonant circuit including the first coil and a second resonant circuit including the second coil is higher than a frequency of an AC voltage supplied to the power transmission coil.

5. The power transmission device according to claim 4, wherein the resonant frequency is different from a harmonic frequency of the AC voltage supplied to the power transmission coil.

6. A power reception device that receives electric power output from a power transmission device, the power reception device comprising:

a power reception coil configured to receive electric power from a power transmission coil of the power transmission device in a contactless manner; and a foreign object detector provided below the power reception coil, with the power reception coil being configured to receive the electric power from the power transmission coil located below the power reception coil, the foreign object detector including a plurality of first coils arranged along a lower surface of the power reception coil, and a plurality of second coils arranged along the lower surface of the power reception coil above or below the plurality of first coils, the plurality of second coils being provided to correspond to the plurality of first coils, the plurality of second coils each being arranged to face a corresponding one of the first coils, and an outer shape of each of the plurality of first coils and of each of the plurality of second coils being smaller than an outer shape of the power reception coil when the power reception coil, the plurality of first coils and the plurality of second coils are viewed two-dimensionally from below the power reception coil, wherein the foreign object detector further includes a switching device configured to switch among pairs of coils, the pairs each including one of the plurality of first coils to which an AC voltage for detection is applied and one of the second coils corresponding to the first coil to which the AC voltage for detection is applied, and the power reception device further comprises a control device controlling the switching device so as to successively switch among the pairs each including the first coil to which the AC voltage for detection is applied and the second coil corresponding to the first coil to which the AC voltage for detection is applied, the control device determining presence or absence of a foreign object based on a power receiving state of the second coil corresponding to the first coil to which the AC voltage for detection is applied.

7. The power reception device according to claim 6, wherein the plurality of first coils and the plurality of second coils are arranged in a matrix, within a housing containing the power reception coil, on a lower surface of the housing.

8. The power reception device according to claim 6, wherein the plurality of first coils and the plurality of second coils each have a shape formed by arranging at least one pair of coil elements having a same number of turns and wound in opposite directions on a same plane and by connecting the coil elements in series.

9. The power reception device according to claim 6, wherein a resonant frequency of each of a first resonant circuit including the first coil and a second resonant circuit including the second coil is higher than a frequency of an AC voltage supplied to the power transmission coil.

10. The power reception device according to claim 9, wherein the resonant frequency is different from a harmonic frequency of the AC voltage supplied to the power transmission coil.

* * * * *